(12) United States Patent
Hendry et al.

(10) Patent No.: US 10,349,119 B2
(45) Date of Patent: Jul. 9, 2019

(54) NETWORK MANAGMENT (71) Applicant: Comcast Cable Communications, LLC, Philadelphia, PA (US)

(72) Inventors: Kevin Hendry, London (CA); Andrew Wilson, London (CA)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 14/625,064

(22) Filed: Feb. 18, 2015

(65) Prior Publication Data

US 2016/0014454 A1 Jan. 14, 2016

Related U.S. Application Data

(63) Continuation of application No. 12/790,052, filed on May 28, 2010, now Pat. No. 8,990,867.

(51) Int. Cl.
*H04N 21/44* (2011.01)
*H04N 21/436* (2011.01)
*H04L 12/28* (2006.01)
*H04N 21/433* (2011.01)
*H04N 21/458* (2011.01)
*H04N 21/472* (2011.01)
(Continued)

(52) U.S. Cl.
CPC ....... *H04N 21/43622* (2013.01); *G11B 27/06* (2013.01); *H04L 12/2838* (2013.01); *H04N 21/4334* (2013.01); *H04N 21/43615* (2013.01); *H04N 21/442* (2013.01); *H04N 21/4583* (2013.01); *H04N 21/47214* (2013.01); *H04L 41/0659* (2013.01); *H04L 2012/2849* (2013.01)

(58) Field of Classification Search
CPC ... H04N 21/274; H04N 7/181; H04N 21/2181
See application file for complete search history.

(56) References Cited

U.S. PATENT DOCUMENTS 7,284,032 B2 * 10/2007 Weber ............... H04L 29/06027
709/204
2003/0118014 A1 * 6/2003 Iyer ........................ H04N 5/782
370/389
(Continued)

FOREIGN PATENT DOCUMENTS

WO 2008077149 A2 6/2008

OTHER PUBLICATIONS

European Office Action—EP Appl. 11166997.4—dated Jul. 19, 2016.
(Continued)

*Primary Examiner* — Cai Y Chen
(74) *Attorney, Agent, or Firm* — Banner & Witcoff, Ltd.

(57) ABSTRACT

A system and method are disclosed for managing networks. Devices in a neighborhood may communicate with a termination server (TS) at a local office. The devices may also communicate locally with one another using a second, localized network. As an alternative to obtaining network communication and initialization data from the TS, the devices may consult with devices on the local network to determine if such devices have the initialization data available for use. Through the local network, the devices may also share tuning resources with one another, so that neighboring devices may use each others' resources to render or record additional content when their own resources are otherwise unavailable.

37 Claims, 7 Drawing Sheets

(51) Int. Cl.
*G11B 27/06* (2006.01)
*H04N 21/442* (2011.01)
*H04L 12/24* (2006.01)

(56) References Cited

U.S. PATENT DOCUMENTS

| | | |
|---|---|---|
| 2004/0156614 A1 | 8/2004 | Bumgardner et al. |
| 2006/0035610 A1 | 2/2006 | Potrebic |
| 2007/0157281 A1* | 7/2007 | Ellis .................. H04N 7/17309 |
| | | 725/134 |
| 2007/0174287 A1 | 7/2007 | McEnroe et al. |
| 2008/0022012 A1* | 1/2008 | Wang ..................... H04L 47/10 |
| | | 709/238 |
| 2008/0282312 A1 | 11/2008 | Blinnikka |
| 2009/0103893 A1* | 4/2009 | Sugino .................. H04N 5/782 |
| | | 386/292 |
| 2009/0254600 A1* | 10/2009 | Lee .................... H04N 21/4135 |
| | | 709/201 |
| 2012/0114311 A1* | 5/2012 | Sutherland ....... G11B 20/10527 |
| | | 386/292 |

OTHER PUBLICATIONS

Extended European Search Report, EP11166997, dated Mar. 28, 2012.
European Office Action—EP 11166997.4—dated May 20, 2015.
Mar. 9, 2017—Canadian Office Action—CA 2741208.
Jul. 21, 2017—European Office Action—EP 11166997.4.
Feb. 8, 2018—Canadian Office Action—2,741,208.

* cited by examiner

NETWORK MANAGMENT

CROSS REFERENCE TO RELATED CASES

This application is a continuation of application Ser. No. 12/790,052, filed May 28, 2010, entitled NETWORK MANAGEMENT, herein incorporated by reference in its entirety for all purposes.

FIELD OF ART

The features described herein generally relate to providing users with access to content over a network.

BACKGROUND

We truly are in an "Information Age." Desktop computers, laptop computers, netbooks, personal data assistants (PDAs) and cell phones have us connected to one another (and to other computers) more than ever before. Even pre-Information Age devices like automobiles are now connecting to a network (e.g., cellular phone network) and offering amazing new functions and services.

The growing variety of service offerings on networks such as the Internet has led to a growing demand being placed on the hardware infrastructure that supports those networks. The support devices in those networks—routers, servers, etc.—have to support an ever-growing number of end users and their own information-hungry devices, and this heavy load has strained, and sometimes overloaded, those support devices. An overloaded support device might cause unsatisfactory delays in service, or render some services completely unavailable, and there is an ever-present need to avoid such an overload situation.

SUMMARY

This summary is not intended to identify critical or essential features of the inventions claimed herein, but instead merely summarizes certain features and variations thereof.

As described herein, a first device may request to temporarily use tuning resources of other devices when the first device's own tuning resources are unavailable. For example, one network interface device, such as a television set-top box, for example, may request to use the tuner of a neighboring network interface device gateway, a display device, or set-top box to tune to and record a television program. The neighboring device may grant this temporary use based on its own availability. As another example, a newly-installed device may obtain initial configuration and initialization information from other local devices, possibly bypassing a standard initialization process that would otherwise have been needed.

The request and communication among neighboring devices may be conducted using a local communication network that is distinct or separate from the network from which the content will be tuned. The neighboring devices may use this network to transfer the recorded content (or portions thereof) to the original requesting device. In some instances, download responsibilities may be divided among multiple devices, with each downloading a portion of the overall requested content. Download responsibilities may also be dynamically reallocated in response to devices becoming unavailable.

The tuning resources, in some embodiments, may be radio frequency tuners to isolate channel frequencies. In other embodiments, the tuning resources may be logical communication sessions or channels (which may coexist on the same physical medium).

In some embodiments, devices may belong to multiple local networks. A device that is unavailable to service a request originating from one local network may be asked to transmit a secondary request on a second local network, different from the first.

Other details and features will also be described in the sections that follow.

BRIEF DESCRIPTION OF THE DRAWINGS

Some features herein are illustrated by way of example, and not by way of limitation, in the figures of the accompanying drawings and in which like reference numerals refer to similar elements.

DETAILED DESCRIPTION

Figure 1:
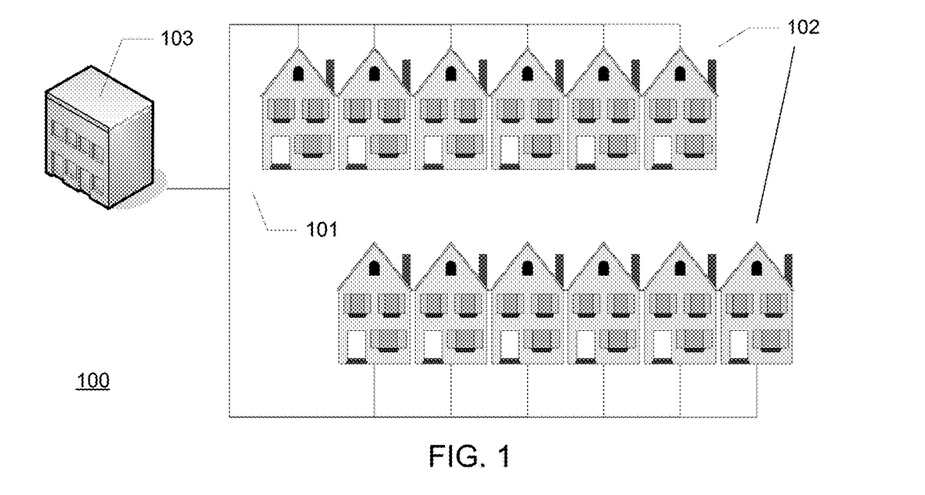
FIG. 1 illustrates an example content delivery network.

FIG. 1 illustrates an example information distribution network 100 on which many of the various features described herein may be implemented. Network 100 may be any type of information or content distribution network, such as satellite, telephone, cellular, wireless, etc. One example may be a hybrid fiber/coax distribution network found in many television content distribution networks. Such networks 100 may use a series of interconnected transmission lines (e.g., fiber optic lines, wireless links, coaxial cables, etc.) 101 to connect multiple premises 102 to a provider's network, for example, to a provider's central office or headend 103. The central office 103 may transmit downstream information signals onto the lines 101, and each premise 102 may have a tuner used to receive and process those signals.

The lines 101 may be a series of interconnected coaxial cables, optical fibers, telephone twisted pair, wireless links etc. There may be one line originating from the central office 103, and it may be split a number of times to distribute the signal to various premises 102 in the vicinity (which may be many miles) of the central office 103. The lines 101 may include components not illustrated, such as splitters, filters, amplifiers, etc. to help convey the signal clearly. Portions of the lines 101 may also be implemented with a hybrid network of lines, such as fiber/cable network of lines. By running fiber optic cable along those portions, signal degradation in those portions may be significantly minimized, allowing a single central office 103 to reach even farther with its network of lines 101 than before.

Figure 2:
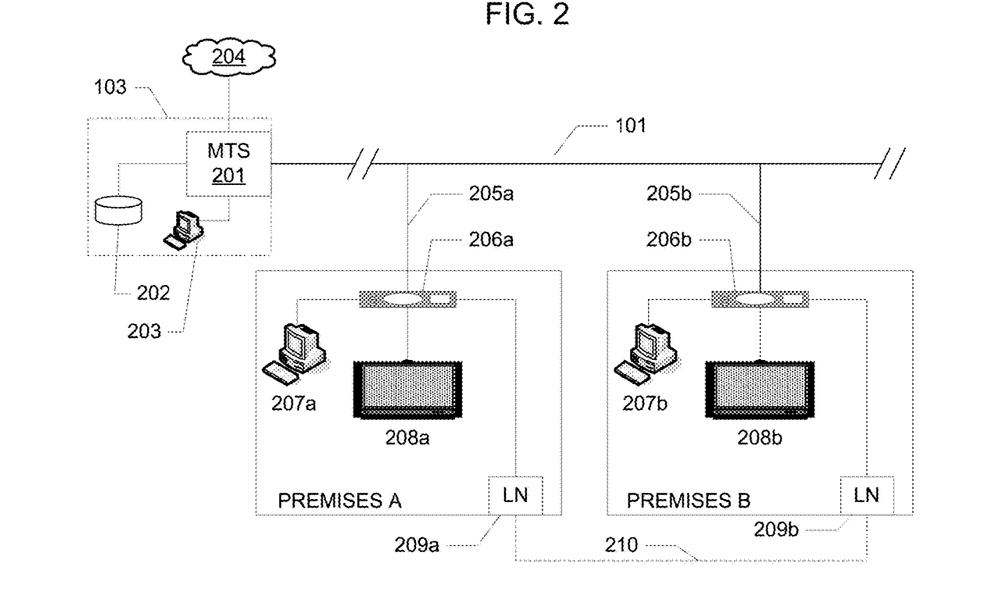
FIG. 2 illustrates a modified version of the FIG. 1 network, with a closer level of detail on several of the premises illustrated in the FIG. 1 network.

FIG. 2 illustrates a closer view of some of the components from FIG. 1. The central office 103 may include a modem termination system (MTS) 201, such as a cable modem termination system (CMTS), which may be a computing device configured to manage communications between devices on the network 101 and backend devices such as content sources 202 (e.g., video on demand servers, television program sources, etc.), central office computers 203 and other networks 204. The MTS, in one example, may be as specified in the Data Over Cable Service Interface Specification (DOCSIS) standard, published by Cable Television Laboratories, Inc. (a.k.a. CableLabs), or it may be a similar or modified device instead. The MTS 201 may be configured to place data on one or more downstream frequencies to be received by modems (e.g., interface devices, such as coaxial cable modems, fiber interface nodes, etc.) at the various premises 102, and to receive upstream communications from those modems on one or more upstream frequencies, and that down/upstream data can be received from/forwarded to the various other devices/networks 202, 203, 204 mentioned above. Although an example is a DOCSIS CMTS, similar components may be used with different standards and different line types (e.g., optical, telephone, wireless, etc.).

FIG. 2 shows a closer view of two premises 102, labeled "Premises A" and "Premises B" in the figure. As illustrated, these premises each receive their own feed 205*a,b* from the lines 101. The feed 205*a,b* may simply be split off of the same line 101, or via another type of line such as fiber optic, twisted pair telephone, etc. The feed 205*a,b* need not be a physical wire. For example, the feed 205*a,b* may be implemented as a wireless channel from a cellular telephone network, satellite network, local area wireless (e.g., WiMax), or any other desired wireless communication interface.

The feeds 205*a,b* may each be communicatively coupled to an interface device 206*a,b*, which may be a gateway device, interface device, modem, cable modem, digital video recorder (DVR), set-top box (STB), display device, or any other desired interface device. The FIG. 2 example, and examples described further below, depicts these interface devices as set-top boxes, but any desired type of interface device can be used. The interface devices 206*a,b* may then be connected to various devices within the premise, and may allow those devices to communicate with the central office 103. Illustrated devices include computers 207*a,b*, televisions 208*a,b*, and local network interfaces 209*a,b*. Alternatively, devices 207 and 208 may incorporate the functionality of devices 206, and thus, be one device.

The network interfaces 209*a,b* may be any desired type of interface that can establish a communication link 210 between nearby premises 102. The link 210 may be wireless (e.g., WiMax, IEEE 802.11, etc.) or wired (e.g., Ethernet, power line data network, fiber or coax, etc.), and may allow devices within neighboring premises to communicate with one another. In one example, the link 210 may be a coaxial cable link using the Multimedia Over Coax Alliance (MoCA) standard, which allows data to pass over coaxial cables without disturbing traditional coaxial cable signaling traffic. The MoCA link 210 may be between neighboring premises, such as businesses, homes, apartments, etc., and it may alternatively be within a single premise, such as in the case of a multiroom DVR setup.

Figure 3:
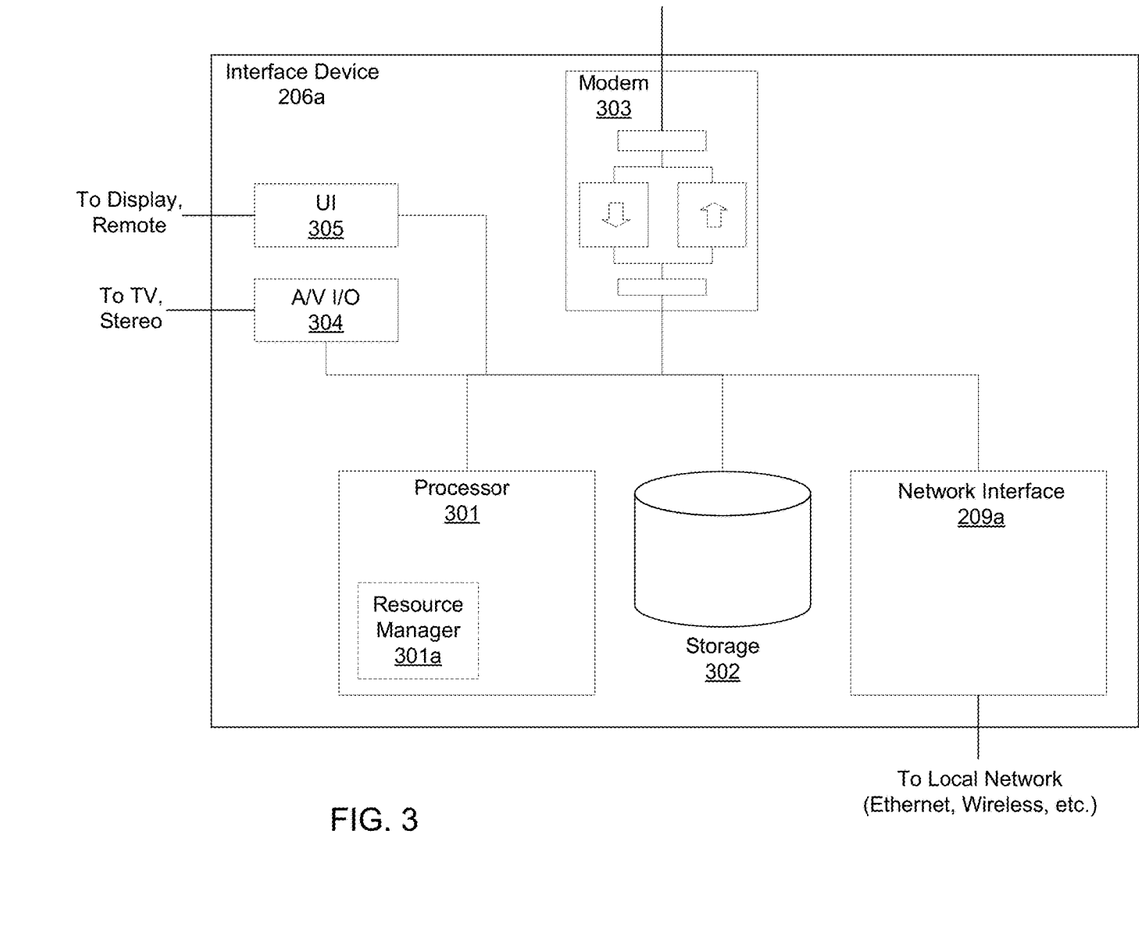
FIG. 3 illustrates example components of a hardware device used herein.

FIG. 3 illustrates an example component view of the interface system or interface device 206*a*. The interface device 206*a* may operate under the control of one or more processors 301. The processor 301 may be configured to execute computer-executable instructions, or computer programs, stored in a storage 302, to perform the various functions described herein. One example program, when executed, may perform a resource manager process 301*a*, which may be responsible for a device such as a set-top box identifying and allocating resources, as described in greater detail below. The storage 302 may be any desired type of information storage device, such as a hard drive, floppy drive, compact disk (CD), flash memory, etc.

The processor 301 may use a modem circuit 303 to communicate over the network 101. For incoming (downstream) data, the modem 303 may include a tuner to isolate and receive one or more downstream frequencies transmitted by the MTS 201, and circuitry to extract information that is carried on the received frequencies. For outgoing (upstream) data, the modem 303 may include one or more transmitters configured to modulate data onto one or more upstream frequencies, using whatever form of modulation (e.g., QPSK, 16 QAM, 64 QAM, etc.) is desired. For some networks, such as hybrid fiber-coax networks, the upstream and downstream frequencies may be allocated and managed according to DOCSIS. The modem circuit 303 may be any desired type of modulation/demodulation circuit, depending on the type of network 101. So, for example, the modem can be a coaxial cable modem, fiber optic modem, an optical fiber interface unit, wireless transceiver, etc.

The incoming/downstream data received by the interface device 206*a* may include, for example, audiovisual content, such as television programming, movies, video on demand, etc. The content may also include program guide information (e.g., program listings and times, prices, descriptions, etc.), and data used by applications running on devices such as an interface device or set-top box. That content may be received by the modem 303 (or any other tuner within the interface device 206*a*), and processed by audio/video input/output circuitry 304 for output to a display device, such as a television 208*a*, or to a stereo or other audiovisual device.

The incoming/downstream data may alternatively (or additionally) include other types of data, for example, packet-switched network data such as Internet traffic. The other data may be processed by processor 301 for display as well using the audio/video input/output 304, or it may be passed on to other devices via a network interface 209*a*. The network interface 209*a* may be any desired type of local network interface, as discussed above. For example, interface 209*a* may include an Ethernet interface, and may allow one or more other devices (e.g., computer 207*a*) to connect to a network, such as the Internet. The interface 209*a* may include one or more wireless interfaces supporting wireless networking such as WiMax and IEEE 802.11.

If desired, data may be presented to a user of the interface device 206*a* through a user interface 305 as well. The user interface 305 may include a text display on the interface device 206*a*, one or more light emitting diodes (LEDs), a speaker, or any other desired interface to present feedback to a user, such as a display device. The user interface 305 may also include input devices such as pushbuttons, keyboard, mouse, microphone, infrared receiver (e.g., for a wireless remote control), touch screen display, or any other desired device for receiving user input or commands.

The FIG. 3 example is an example hardware configuration. Modifications may be made to add, remove, combine, divide, etc. components as desired. Additionally, the components illustrated may be implemented using basic computing devices and components, and the same components (e.g., processor 301, storage 302, user interface 305, etc.) may be used to implement any of the other computing devices and components described herein. For example, the various components herein (e.g., content source 202, MTS 201, computer 207, etc.) may be implemented using computing devices having components such as a processor executing computer-executable instructions stored on a computer-readable medium, as illustrated in FIG. 3.

Figure 4:
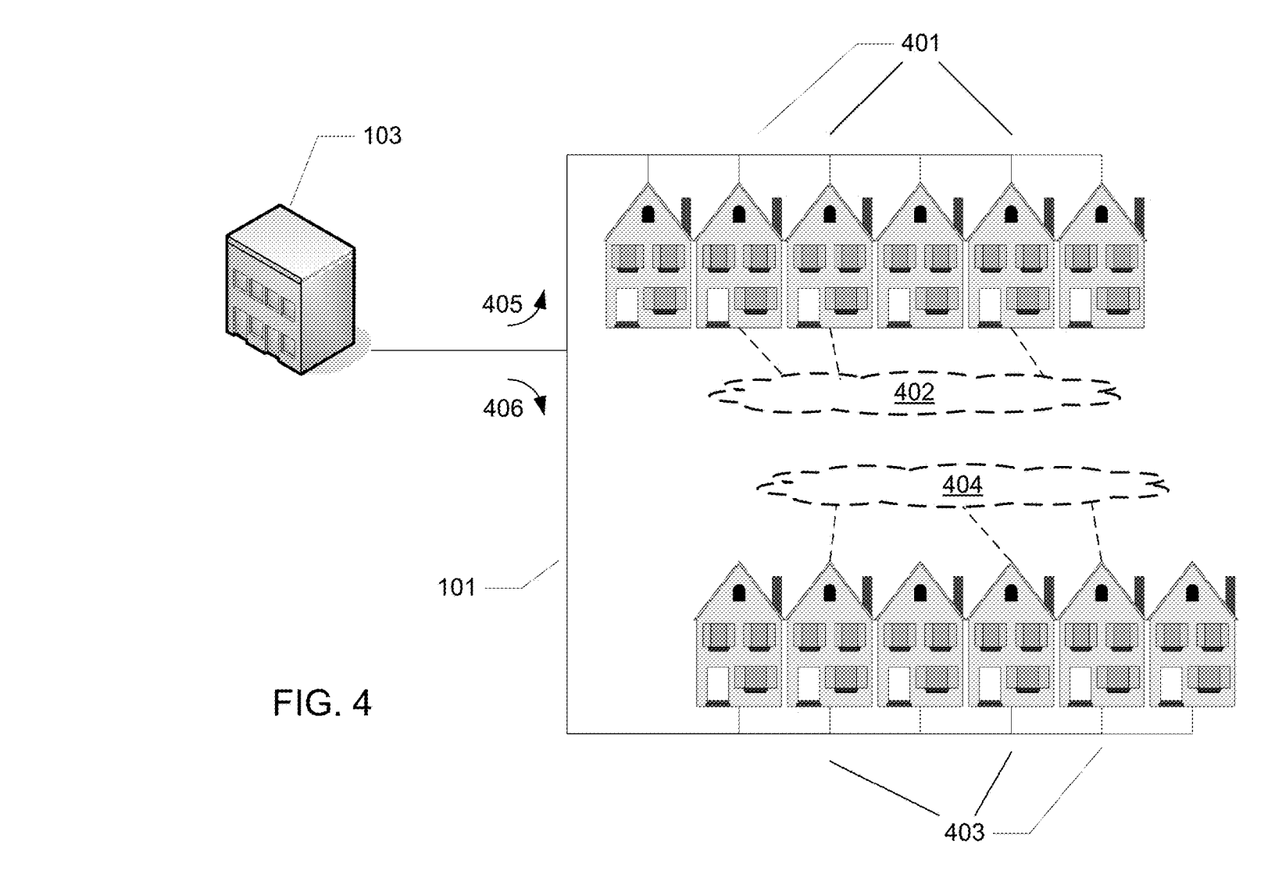
FIG. 4 illustrates an example grouping of premises and local logical networks.

FIG. 4 illustrates a modified version of the FIG. 1 configuration. In the FIG. 4 version, groups of premises may be connected to one another via their local network interfaces 209a,b, forming a logical network operationally distinct from the network 101 noted above. The group may be located near one another, such as neighboring townhomes, individual apartments in a downtown highrise, or the like. For example, a group of neighboring townhomes 401 may be connected to one another by their local interfaces, forming local logical network 402. Another group of premises 403 may form a separate local logical network 404. The logical networks 402, 404 may be wireless networks spanning neighboring premises. As will be discussed below, the local logical networks may streamline operations over the network 101.

Figure 5A:
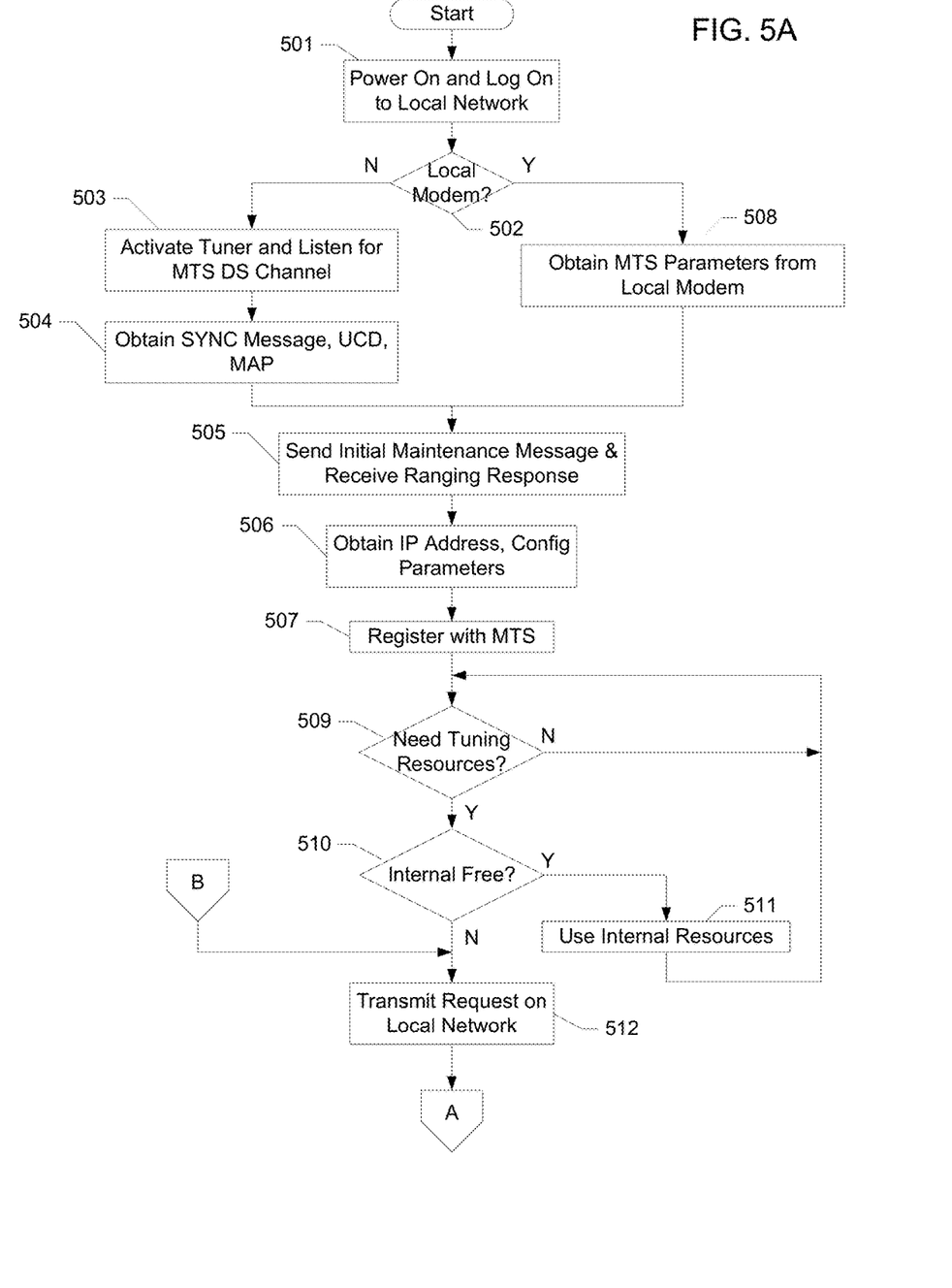
FIGS. 5a-b illustrate an example process of tuner resource allocation.
Figure 5B:
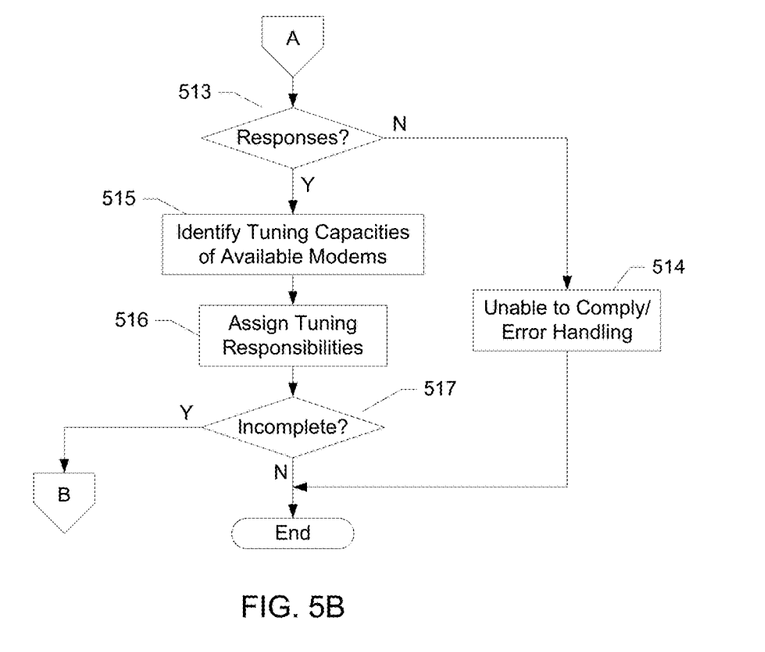

FIGS. 5a and 5b illustrate an example process of managing a network according to some aspects of the disclosure. In the initial step 501, an interface device (e.g., a gateway, modem, set-top box, etc.) may initially be powered on and connected to the local network (e.g., via interface 209a) and to the network 101. This may include communications to log on to the local network (e.g., logging onto a local wireless network).

In step 502, the interface device may transmit a query on the local network to determine if there is another interface device on the local network that has already successfully communicated with a MTS, or a component having similar functionality, of the network 101. The query may be transmitted using any protocol used by the local network. For example, the request may be an IEEE 802.11 signal addressing the other devices on the local network, and including a request for those devices to respond if they have successfully communicated with a MTS over the network 101.

If no local interface device responds, then the process may proceed to step 503, and the normal initialization of an interface device may be initiated (e.g., in an example of an HFC network, a DOCSIS cable modem initialization). For example, in step 503, the interface device may activate its tuner and begin listening for an MTS downstream channel. The interface device may be programmed to sequentially tune to a predetermined set of frequencies and modulation rates to find a downstream channel having a data pattern that it recognizes and can successfully receive. In HFC networks implementing DOCSIS 1.1 and 2.0, it may not be uncommon for an interface device to spend several minutes searching for a downstream frequency that it can recognize.

When the interface device finds a downstream channel it can recognize, it processes the downstream data in step 504 and obtains a SYNC message, UCD (Upstream Channel Descriptor), and an upstream bandwidth allocation MAP from the downstream data. These DOCSIS messages, implemented on some networks, are used to provide time synchronization information (SYNC) to allow the modem to synchronize its clock with the MTS, upstream channel descriptor (UCD) to define characteristics of the return path channel being used by the MTS (e.g., defining the frequency, modulation, symbol rate, burst profile, etc.), and an allocation MAP that defines the various upstream time slots (and whether the slots have been allocated to existing modems), including an identification of slots that have been reserved for newly connected modems (e.g., an initial maintenance transmit opportunity). The interface device can use this information to determine how and when to transmit information on the upstream channel to the MTS. The interface device can also tune to a channel to identify network locality information, which may identify a geographic location or a network location of the STB. For example, the central office 103 may transmit locality information indicating a geographic area that is served by the central office 103, and the receiving devices may use this locality information in formulating future requests (e.g., they may identify themselves as being in the identified locality).

With this information, the interface device can then transmit, in step 505, an upstream message to initialize communications and perform ranging. This upstream message may include a series of messages and expected responses from the MTS. The device can use the responses (or lack thereof) from the MTS to fine-tune timing, frequency offsets and power levels for transmissions going to the MTS. This initialization can include, for example, performing a QAM network locality check, performing TSID (Transport Stream Identifier) autodiscovery, pay-per-view metadata collection, video on demand configuration data, load balancing, etc. The initialization can also include higher level initializations, such as transmitting data that is used by applications running on the interface device. For example, an interface device may run a program guide application, and this initialization may provide program guide data, such as television show listings, times, descriptions, prices, advertisements, interactive options, etc.

When the initialization is complete, the interface device may obtain an Internet Protocol address in step 506. This address may be assigned, for example, by a server at the central office (e.g., a Dynamic Host Configuration Protocol server). The interface device can also download configuration additional information (e.g., identifying services the device is permitted to support, bandwidth it is allowed to use, etc.) to complete its setup.

In step 507, the interface device may transmit a registration messages to the MTS, or like device, informing the MTS that it has received the configuration file and is ready to begin using the network. The MTS may then authorize the interface device for use, and can begin accepting data/requests from the interface device.

If, back in step 502, a local interface device had responded to the new interface device, then much of these initialization steps may be skipped and/or altered. In step 508, the new interface device may then communicate with the responding local interface device to request various parameters for communicating with the MTS. For example, the new interface device may request that the responding interface device provide an identification of the downstream MTS channel being used, its parameters (e.g., what frequency and modulation the MTS is using), the UCD, the current MAP, etc. The request may also request other types of information, such as locality information, program guide data, software applications, etc.

If more than one interface device had responded, then the requesting interface device may implement an algorithm for determining which responder to use. One example algorithm may simply be a first-to-respond algorithm, in which the first interface device to respond is used. Additionally, responding interface devices that are not chosen to be used may still be identified in a backup list by the requesting interface device, and the requesting interface device may use the backup list in case the selected responding interface device later becomes unavailable. Entries in the list of responding, but unselected, interface devices may be retained for a predetermined amount of time, and then discarded. Whichever responding interface device is selected, the new interface device may then communicate with the responding interface device to obtain and copy the requested initialization information. In this manner, the new interface device may avoid having to obtain the same data from the central office 103. This may be useful, for example, since some of the data may require a longer period of time to obtain from the central office 103 (e.g., certain program guide listings might only be sent once every 15 minutes or so, and it may be faster to just copy that from a neighbor).

Having "copied" this information from its "neighbor" (the responding device), the new interface device can avoid spending time listening for the downstream channel and obtaining these values itself. The new interface device can then use those parameters to complete registration with the MTS. For example, the new interface device may proceed to step 505 and transmit its own ranging messages to establish, for example, its own time offset, frequency skew and power level for upstream communications; obtain the IP address and configuration file in step 506; and register separately with the MTS in step 507.

When the new interface device has been registered with the MTS, it can begin receiving data from and sending data to the MTS. In step 509, the device may wait until there is a tuning use that needs its tuning resources (e.g., a tuner used to obtain downstream data from the central office 103 or MTS). The tuning resources may be needed, for example, when a user requests to view or record a television program, download on-demand content such as a movie, or otherwise download data. When such resources are needed, the interface device may determine in step 510 whether its own internal resources are available for the job. This may involve determining whether the tuner is currently being used to tune to another television channel, or (if the need is a future need, such as recording a future television program) the interface device may check an internal list of future scheduled recordings to determine if the tuner is already scheduled for another use that would conflict with the new need. If the resources are available, then the process may move to step 511, and the interface device may simply use its own internal resources to handle the request, and/or schedule its own resources to handle a future request.

However, the device's internal resources might not be available. For example, the interface device may already be in the process of tuning to another television channel for recording purposes. Or, the interface device may already be scheduled to tune to (and perhaps record) another television program on a different channel at the time of the new request. In such a situation, the interface device may transmit a request 512 on the local network to the other local interface devices. The request may include an identification of the requesting device itself, as well as an identification of the tuning that is needed. This may include, for example, identifying the day/time/duration/channel of a requested television program to be downloaded, or providing a unique program identifier from which this information can be determined.

In step 513, with reference to FIG. 5B, the requesting interface device may determine whether any other local interface devices have responded to the request. If no responses have been received, then the interface device may proceed to step 514 and report to the user that it is unable to comply with the request, and perform a desired error handling response to deal with the failure. This may involve, for example, displaying a message on a user's television, indicating that there is a schedule conflict, and giving the user the option of viewing the conflict and resolving it manually by, for example, canceling a scheduled recording to free up the tuner.

However, if one or more neighboring interface devices responded with availability, the requesting interface device may determine, in step 515, what capacities are available across the various responding interface devices. For example, the responses from the various interface devices may include information identifying their respective tuning resource usage and tuner availability (e.g., identifying time windows, bandwidth limitations, etc.). This information may identify times and/or channels that the responding interface device is offering to contribute to help the requesting interface device.

In step 516, the requesting interface device may then assign tuning responsibilities to the one or more of the responding interface devices, and may transmit an assignment message to those interface devices. The assignment message may instruct the interface device as to the time(s) and channel(s) to record. That interface device may then tune to the channel(s) at the time(s), and may forward the received data to the requesting interface device via the local network. Alternatively, the interface device may tune to and record the requested content, storing it on a hard drive local to the interface device, and forward that content to the requesting interface device at some point afterwards (e.g., after the program is completed, or in response to a follow-up request). In this manner, the requesting interface device was able to borrow and temporarily use a neighboring interface device's tuning capabilities.

In step 517, the requesting interface device may determine whether its desired tuning has been successfully completed, or if it was incomplete. The tuning may be incomplete, for example, if one of the other interface devices is unable to fulfill its original assignment. This may occur, for example, if the owner of that other interface device requests to use his/her own interface device at the time of the requesting interface device's desired program. The various interface devices may give their respective owners higher priority in tuner resource use, so an interface device that had previously been available for helping out a neighbor might become unable to do so. When this occurs, the interface device may transmit a message to the requesting interface device, indicating that it is no longer able to perform the assigned tuning.

If, in step 517, the requesting interface device determines that the assigned interface device(s) is (are) no longer able to perform the assigned tuning, then the requesting interface device may return to step 512 and issue another request on the local network. This time, the request would be for assistance in performing the tuning that was previously assigned to the now-unavailable interface device. From there, the process may repeat, and the tuning responsibility may be reassigned to another nearby interface device.

The process shown in FIGS. 5a & b are illustrative, and modifications may be made. Steps may be added, removed, combined and/or divided as desired for a particular desired implementation. Additional steps may also be added. For example, one such addition may occur to the failure response in step 514. There, instead of (or in addition to) reporting the failure to the user, the requesting interface device may issue a secondary request to the neighboring interface devices on the local network. The secondary request may ask those neighboring interface devices to issue corresponding requests on any other local networks to which they belong (and to which the requesting interface device does not).

Additionally, the various steps and functions described herein may be performed using a computing device, such as the device shown in FIG. 3. Computer-readable media, such as the storage 302, may store computer-executable instructions that, when executed, cause the device to perform as described. The instructions may be stored in any type of computer-readable medium or memory, to configure the operation of the processor 301. For example, instructions may be stored in a read-only memory (ROM), random access memory (RAM), removable media, such as a Universal Serial Bus (USB) drive, compact disk (CD) or digital versatile disk (DVD), floppy disk drive, or any other desired electronic storage medium. Instructions may also be stored in an attached (or internal) hard drive.

Figure 6:
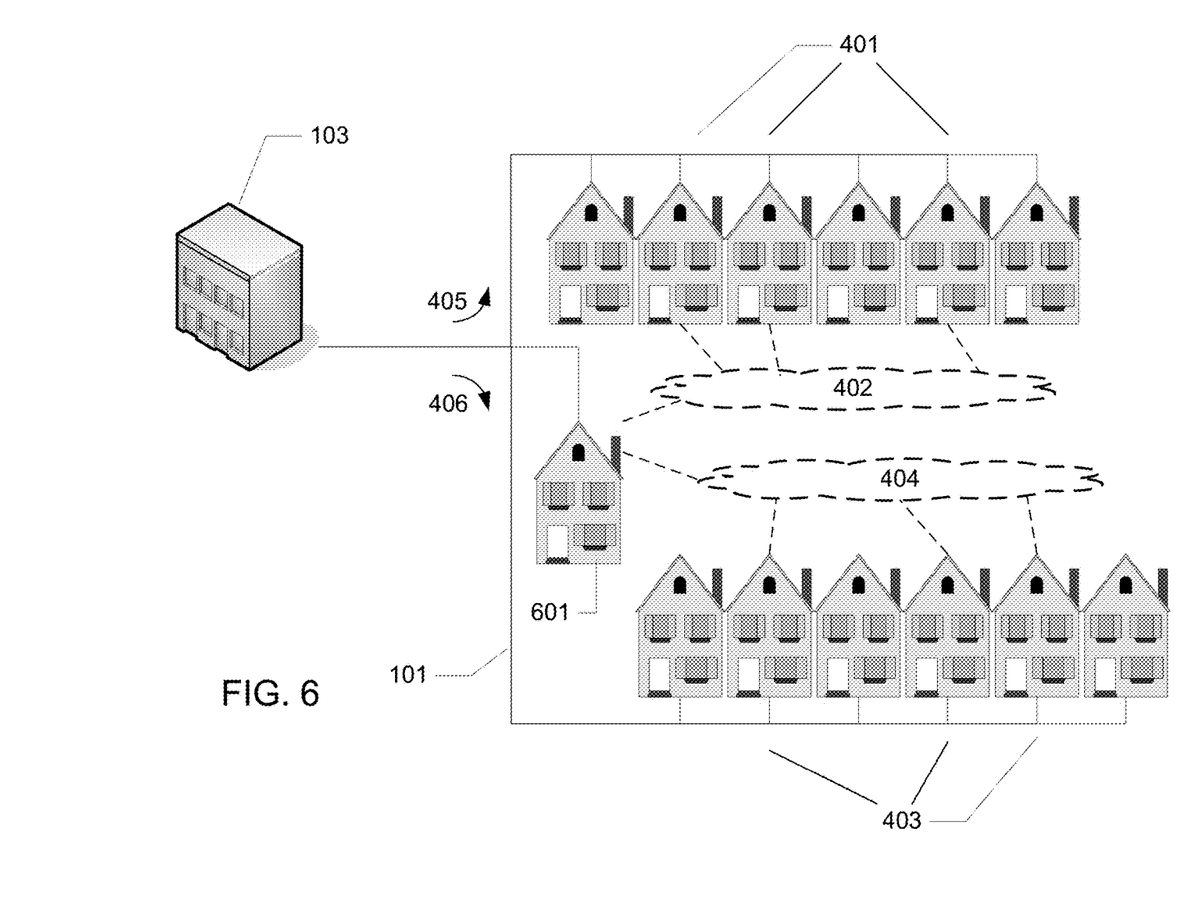
FIG. 6 illustrates a modified example of the FIG. 4 grouping of premises.

This kind of additional request may be used when a particular interface device belongs to two different local networks. FIG. 4 illustrates an example of how two different sets of neighbors may form separate local networks 402 and 404. The different networks may be grouped according to network line 101 splits, so that premises on one side of a split 405 may be in one group, and premises on another side 406 are in another. This grouping may also be based on geographic proximity, or based on whether premises share a common cable drop on the network 101. It is possible, however, for a premise to belong to both groups. FIG. 6 repeats FIG. 4, with the addition of an intermediate premise 601 that is a member of both local networks 402 and 404.

In the FIG. 6 example, an interface device from a premise in group 401 may issue a request to members of local network 402. If none of those members respond as being available, then the secondary request may ask the members of network 402 to issue requests on secondary networks to which they belong. In the case of premise 601, that premise belongs to network 404 as well. In response to that secondary request, the interface device at premise 601 may issue a second request on network 404, repeating the request originally issued on network 402. This secondary request may result in a premise from a different group 403 assisting in the requested tuning.

Figure 7:
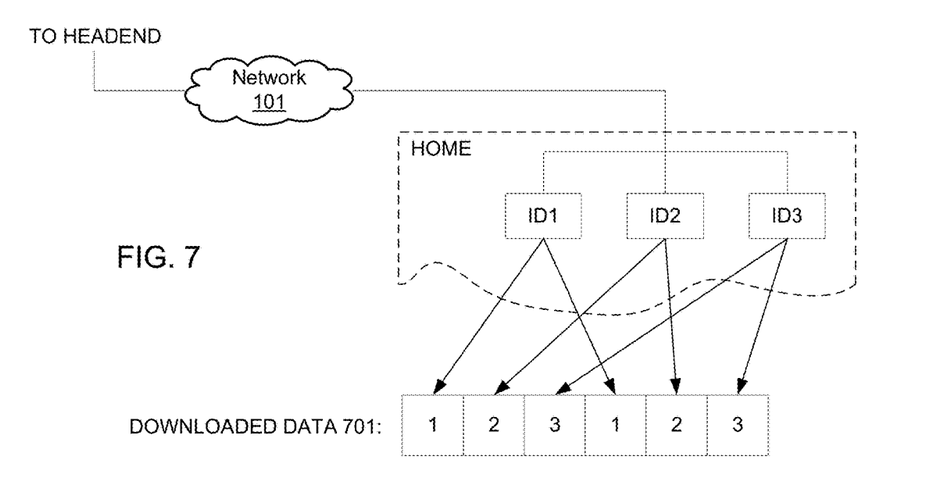
FIG. 7 illustrates an example division of download responsibilities.

Another modification may arise in step 513. In that step, if multiple neighboring interface devices respond with availability, the requesting interface device may divide the tuning responsibilities among those available interface devices, to minimize the amount of time that a particular volunteering would need to be occupied. FIG. 7 illustrates an example of how the downloaded data 701 may be downloaded in discrete portions, with each of a plurality of interface devices responsible for downloading separate discrete portions of the overall data. The plurality of interface devices may then forward their tuned/downloaded portion(s) to the requesting interface device, and the requesting interface device may assemble the portions to reconstruct the complete downloaded data 701.

FIG. 7 also illustrates another alternative embodiment. The various interface devices may all be located at the same premises, such as the same home or business. They can also share the same physical or wireless connection (e.g., a single coaxial or fiber into the premise may be split among the interface devices inside the premise). In such instances, each interface device in the premise may have its own logical connection with the MTS, such as a SIP (Session Initiation Protocol) or HTTP (Hypertext Transfer Protocol) communication session. The tuning capabilities in such an embodiment may be the interface device's ability to use its logical connection to download content.

Figure 8:
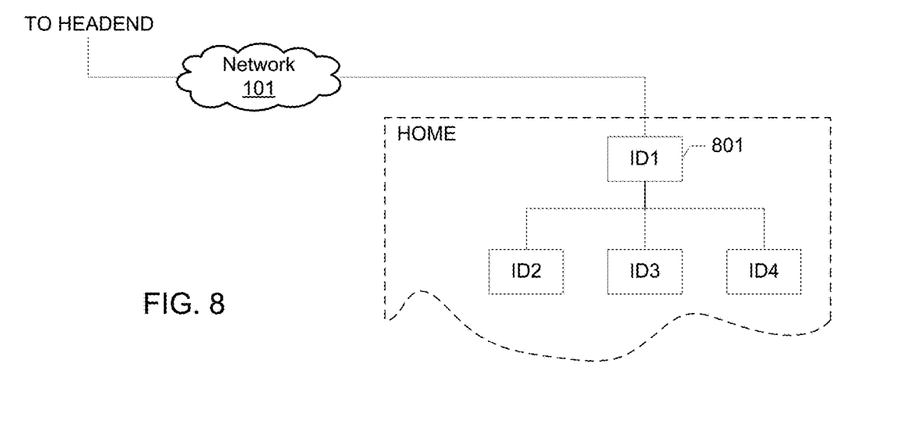
FIG. 8 illustrates an example hierarchy of interface devices within a premise.

FIG. 8 illustrates another example alternative, having a hierarchy of interface devices within a premise. In that alternative, multiple interface devices may be located at the same premises, but they may coordinate their communications with the MTS using a common main interface device 801. The main interface device 801 may be coupled to the network 101, and communicate with the MTS. The other interface devices may use a local network (e.g., Ethernet, wireless, etc.) to communicate with the main interface device 801, and the main interface device 801 may communicate with the MTS on behalf of the other interface devices in the premise. So, for example, if a particular download was needed by interface device ID3, it may issue a request to the main interface device 801, and the main interface device 801 may communicate with the MTS (or to the local network as described herein) to obtain the requested data, and then forward the requested data on to the requesting ID3.

In the examples discussed above, neighboring devices are available to help alleviate some of the burden from overloaded devices. Those neighboring devices may act as a local cache for the burdened device, storing results of common back-end communications (e.g., configuration communication) so that the burdened device need not undergo those communications. Furthermore, in some embodiments, those neighboring devices need not necessarily participate. For example, some interface devices may opt out of being part of this helping group, or certain interface devices may opt in. Advantages of opting in are the interface device gets the benefit of the other interface devices during overload situations, while advantages to opting out are that the interface device need not worry about using its own resources to help its neighbors. There may also be a default opt-in or opt-out. In some situations, if the interface device (e.g., set-top box, gateway, modem, or other device) is one that is owned by the user, then the interface device may opt out as a default, and interface devices that are only leased by the user (and not owned by the user) may opt in as a default.

The various embodiments and examples described above are, as stated, merely examples. Many variations may be implemented to suit a particular implementation, and the various features may be combined, divided, rearranged, omitted and/or augmented as desired. The scope of this patent should not be limited by any of the specific examples described herein, but rather by the claims that follow.

The invention claimed is:
1. A method comprising:
receiving, by a first device, a request to record an individual program;
dividing, by the first device and after a determination that the first device cannot record the individual program in its entirety, responsibilities for recording the individual program between the first device and one or more assisting devices;
recording, by the first device, a first portion of the individual program received via a tuner connected to a first network connection of the first device, wherein the first network connection is between the first device and a provider; and
receiving, by the first device, from a first assisting device of the one or more assisting devices, and via a second network connection of the first device, a second portion of the individual program, wherein the second network connection is between the first device and at least the first assisting device, and the second network connection is different from the first network connection.

2. The method of claim 1, further comprising combining the first portion of the individual program and the second portion of the individual program to form a complete version of the individual program.

3. The method of claim 1, wherein the one or more assisting devices comprises a plurality of assisting devices, the method further comprising:
receiving, by the first device and from a second assisting device of the plurality of assisting devices, a third portion of the individual program; and
combining the first portion of the individual program, the second portion of the individual program, and the third portion of the individual program to form a complete version of the individual program.

4. The method of claim 1, further comprising reallocating the responsibilities for recording the individual program in response to new requests to schedule a recording prior to a start of the recording of the individual program.

5. The method of claim 1, further comprising limiting the responsibilities for recording the individual program to one or more assisting devices located on a common premises as the first device.

6. The method of claim 1, further comprising limiting the responsibilities for recording the individual program to one or more assisting devices based on geographic proximity to the first device.

7. The method of claim 1, further comprising limiting the responsibilities for recording the individual program to one or more assisting devices connected to a same local area network as the first device.

8. The method of claim 1, further comprising:
exchanging, between the first device and the one or more assisting devices, tuner resource usage information,
wherein dividing responsibilities for recording the individual program comprises using the tuner resource usage information to identify one or more available devices having available tuner resources for recording the individual program; and
selecting, by the first device and from the one or more available devices, the one or more assisting devices.

9. The method of claim 1, further comprising:
transmitting, by the first device and to the one or more assisting devices, a secondary request that the one or more assisting devices transmit a resource request to a secondary group of devices different from the one or more assisting devices.

10. A method comprising:
determining, by a first device, one or more other devices connected to the first device via a first network connection of the first device, wherein the first network connection is between the first device and the one or more other devices;
determining, by the first device, that tuning resources of the first device are unavailable for recording an entirety of an individual program, wherein the tuning resources of the first device are associated with a second network connection of the first device, wherein the second network connection is between the first device and a provider; and
sending, after the determining that tuning resources of the first device are unavailable and from the first device via the first network connection to the one or more other devices, a request to temporarily use tuning resources of the one or more other devices for recording a portion of the individual program, wherein the tuning resources of the one or more other devices are associated with a network connection to the provider.

11. The method of claim 10, further comprising:
receiving a request to record the individual program; and
receiving a signal from a responding one of the one or more other devices, wherein the signal gives the first device temporary use of tuning resources, of the responding one of the one or more other devices, to record the portion of individual program.

12. The method of claim 11, further comprising:
recording, by the responding one of the one or more other devices, the portion of the individual program; and
transferring, via the first network connection, the recorded portion of the individual program from the responding one of the one or more other devices to the first device.

13. The method of claim 12,
wherein the first network connection is distinct from the network connection to the provider from which the individual program was tuned.

14. The method of claim 11, further comprising:
receiving one or more additional grants from one or more additional ones of the one or more other devices, wherein the additional grants give permission to the first device to temporarily use tuning resources, of the additional ones of the one or more other devices, to record at least a portion of the individual program; and
using tuning resources, of each of the responding one of the one or more other devices and the one or more additional ones of the one or more other devices, to record different portions of the individual program.

15. The method of claim 10, further comprising dividing recording responsibilities for the individual program among a plurality of the tuning resources of the one or more other devices.

16. The method of claim 15, further comprising:
combining recorded portions from the one or more other devices to form the individual program; and
presenting the individual program to a user of the first device.

17. The method of claim 10, wherein the first device and one or more other devices are connected to a common communication medium, and the tuning resources comprise logical communication sessions on the common communication medium.

18. The method of claim 1, wherein the tuner comprises an analog tuner.

19. A method comprising,
receiving, by a first device, a request to record an individual program;
determining, by the first device, one or more assisting devices connected to the first device via a first network connection of the first device, wherein the first network connection is between the first device and the one or more assisting devices;
determining, by the first device, that tuning resources of the first device are unavailable for recording at least a portion of the individual program, wherein the tuning resources of the first device are associated with a second network connection of the first device, wherein the second network connection is between the first device and a provider of the individual program, and wherein the second network connection is distinct from the first network connection;
dividing, by the first device, responsibilities for recording the individual program between the first device and the one or more assisting devices;
recording, by the first device and using the tuning resources, a first portion of the individual program; and receiving, by the first device, from a first assisting device of the one or more assisting devices, and via the first network connection, a second portion of the individual program.

20. The method of claim 19, further comprising:
receiving, by the first device and from the one or more assisting devices, information indicating one or more termination system downstream channel characteristics detected by the one or more assisting devices.

21. The method of claim 1, further comprising sending, by the first device to the one or more assisting devices and via the second network connection, a request to record the second portion of the individual program.

22. A system comprising:
an apparatus and one or more other devices,
wherein the apparatus comprises:
one or more processors; and
memory storing instructions that, when executed by the one or more processors, cause the apparatus to:
determine one or more other devices connected to the apparatus via a first network connection of the apparatus, wherein the first network connection is between the apparatus and the one or more other devices;
determine that tuning resources of the apparatus are unavailable for recording an entirety of an individual program, wherein the tuning resources of the apparatus are associated with a second network connection of the apparatus, wherein the second network connection is between the apparatus and a provider; and
send, after the determining that tuning resources of the apparatus are unavailable and from the apparatus via the first network connection to the one or more other devices, a request to temporarily use tuning resources of the one or more other devices for recording a portion of the individual program, wherein the tuning resources of the one or more other devices are associated with a network connection to the provider; and
the one or more other devices configured to receive the request to temporarily use tuning resources.

23. The system of claim 22, wherein the instructions, when executed by the one or more processors, further cause the apparatus to:
receive a request to record the individual program; and
receive a signal from a responding one of the one or more other devices, wherein the signal gives the apparatus temporary use of tuning resources, of the responding one of the one or more other devices, to record the portion of individual program.

24. The system of claim 23, wherein the instructions, when executed by the one or more processors, further cause the apparatus to:
cause recording, by the responding one of the one or more other devices, the portion of the individual program; and
receive, via the first network connection, the recorded portion of the individual program from the responding one of the one or more other devices to the apparatus.

25. The apparatus of claim 24, wherein the first network connection is distinct from the network connection to a provider from which the individual program was tuned.

26. The system of claim 23, wherein the instructions, when executed by the one or more processors, further cause the apparatus to:
receive one or more additional grants from one or more additional ones of the one or more other devices, wherein the additional grants give permission to the apparatus to temporarily use tuning resources, of the additional ones of the one or more other devices, to record at least a portion of the individual program; and
use tuning resources, of each of the responding one of the one or more other devices and the one or more additional ones of the one or more other devices, to record different portions of the individual program.

27. The system of claim 22, wherein the instructions, when executed by the one or more processors, further cause the apparatus to divide recording responsibilities for the individual program among a plurality of the tuning resources of the one or more other devices.

28. The system of claim 27, wherein the instructions, when executed by the one or more processors, further cause the apparatus to:
combine recorded portions from the one or more other devices to form the individual program; and
present the individual program to a user of the apparatus.

29. The system of claim 22, wherein the apparatus and one or more other devices are connected to a common communication medium, and the tuning resources comprise logical communication sessions on the common communication medium.

30. One or more non-transitory, computer readable storage media comprising computer executable instructions that, when executed by a computing device, cause the computing device to:
determine one or more other devices connected to the computing device via a first network connection of the computing device, wherein the first network connection is between the computing device and the one or more other devices;
determine that tuning resources of the computing device are unavailable for recording an entirety of an individual program, wherein the tuning resources of the computing device are associated with a second network connection of the computing device, wherein the second network connection is between the computing device and a provider; and
send, after the determining that tuning resources of the computing device are unavailable and from the computing device via the first network connection to the one or more other devices, a request to temporarily use tuning resources of the one or more other devices for recording a portion of the individual program, wherein the tuning resources of the one or more other devices are associated with a network connection to the provider.

31. The one or more non-transitory, computer readable storage media of claim 30, wherein the instructions, when executed by the computing device, further cause the apparatus to:
receive a request to record the individual program; and
receive a signal from a responding one of the one or more other devices, wherein the signal gives the computing device temporary use of the tuning resources, of the responding one of the one or more other devices, to record the portion of individual program.

32. The one or more non-transitory, computer readable storage media of claim 31, wherein the instructions, when executed by the computing device, further cause the apparatus to:

cause recording, by the responding one of the one or more other devices, the portion of the individual program; and receive, via the first network connection, the recorded portion of the individual program from the responding one of the one or more other devices to the computing device.

33. The one or more non-transitory, computer readable storage media of claim 32, wherein the first network connection is distinct from the network connection to a provider from which the individual program was tuned.

34. The one or more non-transitory, computer readable storage media of claim 31, wherein the instructions, when executed by the computing device, further cause the apparatus to:

receive one or more additional grants from one or more additional ones of the one or more other devices, wherein the additional grants give permission to the computing device to temporarily use tuning resources, of the additional ones of the one or more other devices, to record at least a portion of the individual program; and use tuning resources, of each of the responding one of the one or more other devices and the one or more additional ones of the one or more other devices, to record different portions of the individual program.

35. The one or more non-transitory, computer readable storage media of claim 30, wherein the instructions, when executed by the computing device, further cause the apparatus to divide recording responsibilities for the individual program among a plurality of tuning resources of the one or more other devices.

36. The one or more non-transitory, computer readable storage media of claim 35, wherein the instructions, when executed by the computing device, further cause the apparatus to:

combine recorded portions from the one or more other devices to form the individual program; and present the individual program to a user of the computing device.

37. The one or more non-transitory, computer readable storage media of claim 30, wherein the computing device and one or more other devices are connected to a common communication medium, and the tuning resources comprise logical communication sessions on the common communication medium.

* * * * *

UNITED STATES PATENT AND TRADEMARK OFFICE
CERTIFICATE OF CORRECTION

PATENT NO. : 10,349,119 B2
APPLICATION NO. : 14/625064
DATED : July 9, 2019
INVENTOR(S) : Hendry et al.

Page 1 of 1

It is certified that error appears in the above-identified patent and that said Letters Patent is hereby corrected as shown below:

In the Claims

Column 12, Claim 19, Line 46:
Please delete "comprising," and insert --comprising:--

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*